F. M. KINNARD.
SPREADER.
APPLICATION FILED MAR. 24, 1922.

1,430,309.

Patented Sept. 26, 1922.
2 SHEETS—SHEET 2.

Inventor
Frank M. Kinnard

By Freash and Bond
Attorneys

Patented Sept. 26, 1922.

1,430,309

UNITED STATES PATENT OFFICE.

FRANK M. KINNARD, OF SEBRING, OHIO, ASSIGNOR OF ONE-HALF TO CHARLES L. SEBRING, OF SEBRING, OHIO.

SPREADER.

Application filed March 24, 1922. Serial No. 546,293.

*To all whom it may concern:*

Be it known that I, FRANK M. KINNARD, a citizen of the United States, residing at Sebring, in the county of Mahoning and State of Ohio, have invented a new and useful Spreader, of which the following is a specification.

This invention relates to spreaders for use in potteries for batting out clay, preparatory to placing the clay in the molds.

The batters such as are at present in potteries are substantially cylindrical in shape and provided with a handle by means of which the batter is grasped in one hand by the "batter out," and raised above the block upon which the ball of clay is placed and then brought down with considerable force upon the ball of clay, flattening the same and forming what is known in the potteries as a bat.

These batters are necessarily of considerable weight, and it is therefore extremely difficult for the "batter out" to continuously swing the batter and maintain it in proper alignment with the block as it is brought down upon the ball of clay. Even the most proficient "batters out" cannot produce bats of uniform thickness with the usual form of batter above described.

As considerable force is used in striking the ball of clay with the batter, the surfaces of the batter and the block upon which the ball of clay is placed, soon become roughened, causing defects in the ware.

The objects of the present invention are to provide a spreader mounted upon a lever, a counterweight being provided upon the lever for counterbalancing the weight of the spreader, means being provided for rotating the spreader as it is brought into engagement with the ball of clay and for automatically stopping the rotation of the spreader as it is raised.

The above and other objects may be attained by forming the spreader as illustrated in the accompanying drawings, in which—

Figure 1:
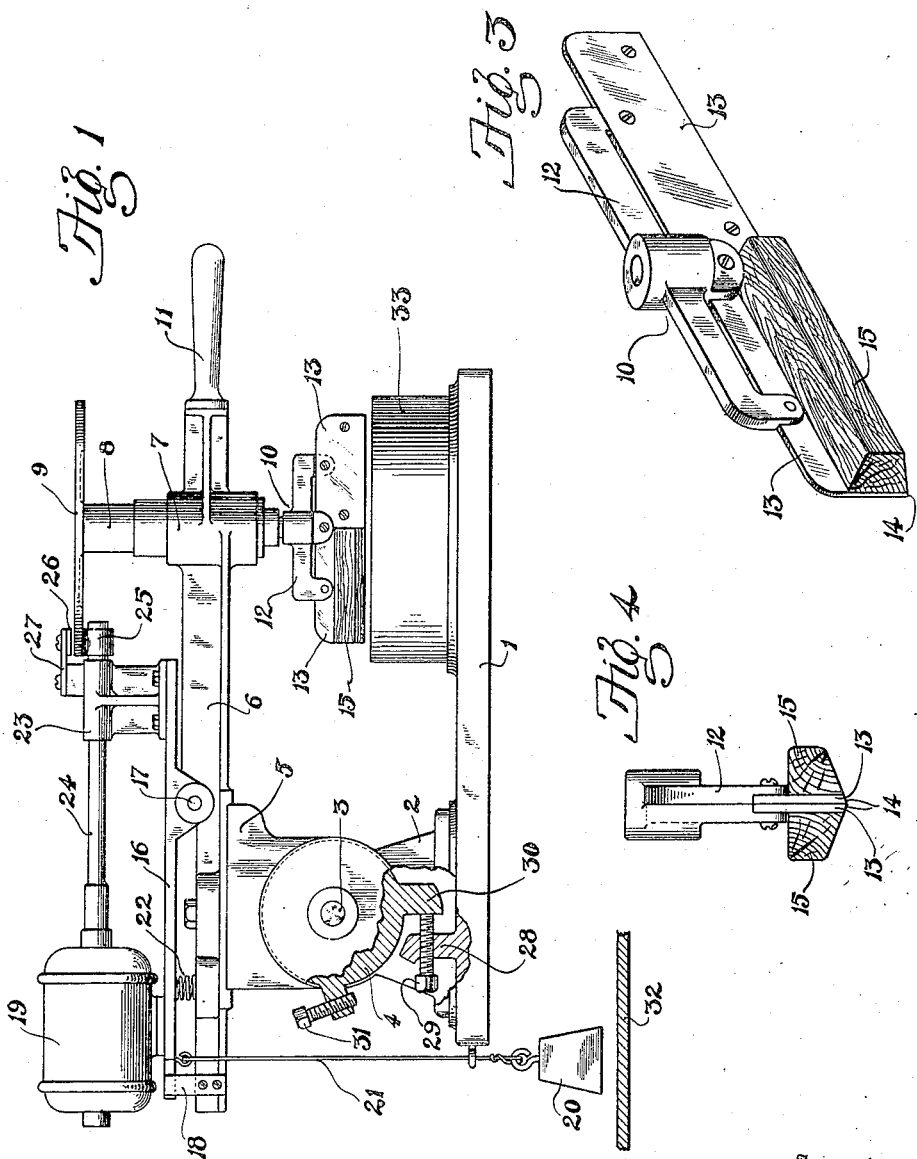
Figure 2:
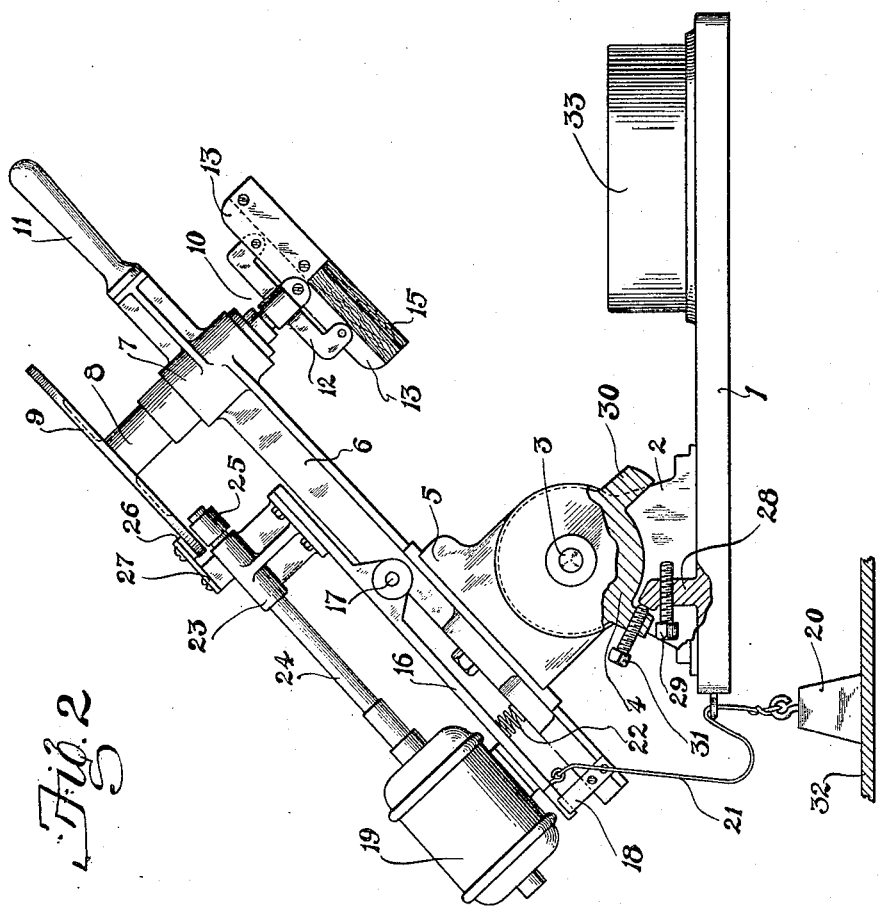

Figure 1 is a side elevation of a spreader embodying the invention showing the same in the operative position, parts being broken away for the purpose of illustration;

Fig. 2, a similar view showing the spreader in the initial position;

Fig. 3, a detail perspective view of the spreading tool; and

Fig. 4, an end view of the same.

Similar numerals refer to similar parts throughout the drawings.

The base upon which the device is mounted is indicated by the numeral 1, and a casting 2 is fixed thereto and provided with the journal 3, upon which the bearing portion 4 of the bracket 5 is journaled.

An arm 6 is carried by the bracket 5 and provided at its forward end with the vertical bearing portion 7 in which is journaled the shaft 8 having at its upper end a friction disk 9 and at its lower end the spreader tool, indicated generally by the numeral 10, an operating handle 11 projecting forwardly from said arm.

The tool comprises the frame 12 having the oppositely disposed blades 13, each of which has the oppositely disposed, lower beveled edge 14, the similarly beveled wooden block 15 being attached to the forward face of each blade.

A lever 16 is pivoted intermediate its extremities as at 17 upon the arm 6, guides 18 being provided upon said arm for guiding the rear end of the lever upon which the motor 19 is mounted, a weight 20 being suspended by a cord 21 from the rear end of the lever, normally compressing the spring 22 which is interposed between the arm 6 and the lever.

A bearing 23 is provided upon the forward end of the lever 16 for the shaft 24 of the motor, a friction pulley 25 being fixed upon said shaft and arranged to engage the friction disk 9. A fiber block 26 is carried by a bracket 27 supported from the bearing 23 and arranged to be normally disengaged from the friction disk as shown in Fig. 1.

A lug 28 upon the base 1 is provided with a set screw 29 arranged to be engaged by the lug 30 upon the bearing 3 to limit the downward movement of the arm 6 as shown in Fig. 1, a set screw 31 carried by the bearing member being arranged to engage said lug to limit the upward movement of the arm 6 as shown in Fig. 2. A shelf 32 is provided a slight distance beneath the normal position of the weight 20 and arranged to support said weight when the arm 6 is raised, as shown in Fig. 2.

With the arm 6 in the position shown in Fig. 2, the motor will counterbalance the weight of the forward end of the arm. The weight 20 resting upon the shelf 32, allows considerable slack in the cord 21, permitting the spring 22 to raise the rear end of the lever 16, moving the friction pulley 25 out of engagement with the friction disk 9 and holding the fiber brake block 26 in engagement with the friction disk, the spreader tool being thus held stationary.

A ball of clay is then placed upon the block 33 and the arm 6 moved to the position shown in Fig. 1 by means of the operating handle 11. As the spreader tool is brought into engagement with the ball of clay, the weight 20 will be moved from the shelf 32, compressing the spring 22 and raising the forward end of the lever 16, moving the brake out of engagement with the friction disk and bringing the friction pulley into engagement therewith, the spreader tool being rotated upon its axis, forming a bat of uniform thickness and smooth surface.

With the use of this device, the work of the "batter out" is made considerably easier, as the motor and weight 20, counterbalances the weight of the forward arm 6, thus eliminating the lifting of the heavy batter by hand.

As each bat is formed, the arm 6 is thrown back to the position shown in Fig. 2, raising the spreader tool from engagement with the bat and automatically stopping the rotation of the same.

It will, of course, be understood that for small work such as fruit saucers, individual butter chips and the like, two or three bats may be made with a single operation of the spreader.

It will be evident from the above description that a batter is provided by means of which considerable of the labor is dispensed with and providing an increased output of work with the minimum effort of the operator.

I claim:—

1. A spreader including a pivoted arm, a rotatable spreader tool carried by the arm, means for rotating the tool when the arm is lowered and means for automatically stopping the rotation of the tool when the arm is raised.

2. A spreader including a movable arm, a rotatable spreader tool carried by the arm, means for rotating the tool when the arm is lowered and means for automatically stopping the rotation of the tool when the arm is raised.

3. A spreader including a movable arm, a vertical shaft journaled in the arm, a spreader tool upon the shaft, means for rotating the shaft when the arm is lowered and means for automatically stopping the rotation of the shaft when the arm is raised.

4. A spreader including a movable arm, a vertical shaft journaled in the arm, a spreader tool upon the shaft, a motor, means for operatively connecting the motor to the shaft when the arm is lowered and means for automatically disconnecting the motor from the shaft when the arm is raised.

5. A spreader including a movable arm, a vertical shaft journaled in the arm, a spreader tool upon the shaft, a motor, a brake, means for operatively connecting the motor to the shaft when the arm is lowered and means for automatically disconnecting the motor and applying the brake when the arm is raised.

6. A spreader including a movable arm, a vertical shaft journaled in the arm, a spreader tool upon the shaft, a friction disk upon the shaft, a friction pulley, means for engaging the friction pulley with the disk when the arm is lowered and means for automatically disengaging the pulley from the disk when the arm is raised.

7. A spreader including a movable arm, a vertical shaft journaled in the arm, a spreader tool upon the shaft, a friction disk upon the shaft, a friction pulley, a brake, means for engaging the friction pulley with the disk when the arm is lowered and means for automatically disengaging the pulley from the disk and engaging the brake therewith when the arm is raised.

8. A spreader including a movable arm, a vertical shaft journaled in the arm, a spreader tool upon the shaft, a friction disk upon the shaft, a lever upon the arm, a friction pulley upon the lever, means for holding the lever in position to engage the friction pulley with the disk when the arm is lowered and means for rocking the lever to move the pulley out of engagement with the disk when the arm is raised.

9. A spreader including a movable arm, a vertical shaft journaled in the arm, a spreader tool upon the shaft, a friction disk upon the shaft, a lever upon the arm, a friction pulley upon the lever, a weight for holding the lever in position to engage the friction pulley with the friction disk when the arm is lowered, and spring means for rocking the lever to move the pulley out of engagement with the disk when the arm is raised.

10. A spreader including a movable arm, a vertical shaft journaled in the arm, a spreader tool upon the shaft, a friction disk upon the shaft, a lever upon the arm, a friction pulley upon the lever for engaging the under surface of the disk, a brake upon the lever for engaging the upper surface of the disk, means for holding the lever in position to engage the pulley with the disk when the arm is lowered and means for rocking the lever to hold the brake in engagement with the disk when the arm is raised.

11. A spreader including a movable arm, a vertical shaft journaled in the arm, a spreader tool upon the shaft, a friction disk upon the shaft, a lever upon the arm, a friction pulley upon the lever, a brake upon the lever, a weight connected to the lever for holding the pulley in engagement with the disk when the arm is lowered and a spring engaging the lever for holding the brake in engagement with the disk when the arm is raised.

12. A spreader tool including a rotatable frame, a pair of diametrically opposed blades, the lower edges of the blades being oppositely beveled and beveled blocks upon the blades.

FRANK M. KINNARD.